United States Patent
Asadi et al.

(10) Patent No.: US 11,780,449 B2
(45) Date of Patent: Oct. 10, 2023

(54) SYSTEM AND METHOD TO ESTIMATE MAXIMUM LATERAL ACCELERATION AND YAW RATE IN LIMIT HANDLING MANEUVERS IN LOW-FRICTION SURFACES

(71) Applicant: GM GLOBAL TECHNOLOGY OPERATIONS LLC, Detroit, MI (US)

(72) Inventors: Ehsan Asadi, North York (CA); Seyedeh Asal Nahidi, North York (CA); SeyedAlireza Kasaiezadeh Mahabadi, Novi, MI (US); Hualin Tan, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 142 days.

(21) Appl. No.: 17/448,907

(22) Filed: Sep. 27, 2021

(65) Prior Publication Data

US 2023/0105572 A1 Apr. 6, 2023

(51) Int. Cl.
*B60W 40/109* (2012.01)
*B60W 40/114* (2012.01)
*B60W 40/068* (2012.01)
*B60W 10/20* (2006.01)

(52) U.S. Cl.
CPC .......... *B60W 40/109* (2013.01); *B60W 10/20* (2013.01); *B60W 40/068* (2013.01); *B60W 40/114* (2013.01); *B60W 2520/125* (2013.01); *B60W 2520/14* (2013.01);

(Continued)

(58) Field of Classification Search
CPC .. B60W 40/109; B60W 10/20; B60W 40/068; B60W 40/114; B60W 2552/40; B60W 2520/125; B60W 2520/14; B60W 2520/263; B60W 2720/125; B60W 2720/14

See application file for complete search history.

(56) References Cited

U.S. PATENT DOCUMENTS

| | | | |
|---|---|---|---|
| 2002/0022915 A1* | 2/2002 | Chen | B60T 8/1764 701/41 |
| 2003/0093206 A1* | 5/2003 | Pallot | B60T 8/1755 701/1 |

(Continued)

*Primary Examiner* — Nicholas Kiswanto
*Assistant Examiner* — Jamal A Shah
(74) *Attorney, Agent, or Firm* — Lorenz & Kopf LLP

(57) ABSTRACT

Systems and methods for vehicle motion control are provided. The method includes: calculating a correction factor using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state; adjusting a desired lateral acceleration and a desired yaw rate by applying the correction factor to account for a reduced level of friction experienced by the vehicle when traveling on a non-ideal friction surface; calculating optimal control actions based on the adjusted desired lateral acceleration and adjusted desired yaw rate; and applying the optimal control actions with vehicle actuators during vehicle operations.

20 Claims, 4 Drawing Sheets

(52) U.S. Cl.
CPC ... *B60W 2520/263* (2013.01); *B60W 2552/40* (2020.02); *B60W 2720/125* (2013.01); *B60W 2720/14* (2013.01)

(56) References Cited

U.S. PATENT DOCUMENTS

| | | | | |
|---|---|---|---|---|
| 2009/0152940 | A1* | 6/2009 | Mercier | B62K 5/05 303/113.2 |
| 2009/0216415 | A1* | 8/2009 | Iwatsuki | B60W 30/188 701/70 |
| 2013/0103263 | A1* | 4/2013 | Hsu | B60W 10/20 701/42 |
| 2017/0320517 | A1* | 11/2017 | Michelis | B60W 40/068 |
| 2018/0178839 | A1* | 6/2018 | Ide | B62D 15/029 |
| 2020/0369257 | A1* | 11/2020 | Hu | B60W 10/20 |
| 2021/0078573 | A1* | 3/2021 | Kashiwamura | B62D 6/003 |

\* cited by examiner

SYSTEM AND METHOD TO ESTIMATE MAXIMUM LATERAL ACCELERATION AND YAW RATE IN LIMIT HANDLING MANEUVERS IN LOW-FRICTION SURFACES

INTRODUCTION

The technical field generally relates to vehicle motion control systems, and more particularly relates to improving motion control system performance on low friction surfaces.

In limit handling maneuvers, a Driver Command Interpreter (DCI) aims to achieve maximum lateral grip by calculating desired dynamics. The DCI, however, works based on the assumption of a dry road condition. When operating with that assumption when a vehicle is driven on a wet road or other low friction surface, the vehicle's motion control system can potentially push the vehicle to perform beyond the vehicle's tire capacities during limit handling maneuvers.

Accordingly, it is desirable to correct desired dynamics for travel on low-friction surfaces during limit handling maneuvers. Furthermore, other desirable features and characteristics of the present disclosure will become apparent from the subsequent detailed description and the appended claims, taken in conjunction with the accompanying drawings and the foregoing technical field and background.

SUMMARY

A motion control system is provided in a vehicle. In one embodiment, the motion control system including a controller. The controller is configured to: calculate a correction factor (multiplier) using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state. The controller is further configured to adjust a desired lateral acceleration and a desired yaw rate by applying the correction factor to account for a reduced level of friction experienced by the vehicle when traveling on a non-ideal friction surface (e.g., wet road, low friction surface) when the vehicle is performing a limit handling maneuver; calculate optimal control actions based on the adjusted desired lateral acceleration and adjusted desired yaw rate; and apply the optimal control actions with vehicle actuators during vehicle operations.

In one embodiment, the controller is configured to determine whether the vehicle is experiencing an understeer, oversteer, or normal steer condition based on calculating an understeer angle for the vehicle.

In one embodiment, the understeer angle is determined based on the difference between a front lateral slip angle $\alpha_f$ and a rear lateral slip angle $\alpha_r$ for the vehicle.

In one embodiment, the controller is configured to determine whether the vehicle is experiencing an understeer, oversteer, or normal steer condition based on front axle and rear axle saturation detection.

In one embodiment, the first set of operations includes calculating the correction factor ($\mu_e$) based on:

$$\mu_e = \frac{F_{y_f}}{F_{y_{max_f}}}$$

wherein $F_{y_f}$ includes the lateral force applied to the front axle, and $$F_{y_{max_f}}$$

includes the maximum lateral force that both front tires (front left and front right tires) together can generate.

In one embodiment, the second set of operations includes calculating the correction factor ($\mu_e$) based on:

$$\mu_e = \frac{F_{y_r}}{F_{y_{max_r}}}$$

wherein $F_{y_r}$ includes the lateral force applied to the rear axle, and $$F_{y_{max_r}}$$

includes the maximum lateral force that both rear tires (rear left and rear right tires) together can generate.

In one embodiment, the third set of operations includes calculating the factor ($\mu_e$) based on:

$$\mu_e = \frac{F_{y_f} + F_{y_r}}{F_{y_{max_f}} + F_{y_{max_r}}}$$

wherein $F_{y_f}$ includes the lateral force applied to the front axle, $$F_{y_{max_f}}$$

includes the maximum lateral force that both front tires (front left and front right tires) together can generate, $F_{y_r}$ includes the lateral force applied to the rear axle, and $$F_{y_{max_r}}$$

includes the maximum lateral force that both rear tires (rear left and rear right tires) together can generate.

In one embodiment, to adjust the desired lateral acceleration and the desired yaw rate the controller is configured to: receive driver steering and acceleration inputs while the vehicle is operated; calculate an ideal lateral acceleration ($A_{y_{ideal}}$) and an ideal yaw rate ($r_{ideal}$) based on the steering and acceleration inputs, a vehicle model, and a tire model; calculate a maximum lateral acceleration ($A_{y_{max}}$) and a maximum yaw rate ($r_{max}$) based on the tire model; generate an adjusted maximum lateral acceleration $$(A_{y_{max_{adj}}})$$

by applying the correction factor ($\mu_e$) to the maximum lateral acceleration ($A_{y_{max}}$); generate an adjusted maximum yaw rate $$(r_{max_{adj}})$$

by applying tile collection factor ($\mu_e$) to the maximum yaw rate ($r_{max}$); calculate the desired lateral acceleration ($A_{y_{des}}$) based on the ideal lateral acceleration ($A_{y_{ideal}}$) and the adjusted maximum lateral acceleration $$(A_{y_{max_{adj}}});$$

and calculate the desired yaw rate ($r_{des}$) based on the ideal yaw rate ($r_{ideal}$) and the adjusted maximum yaw rate ($r_{max_{adj}}$).

In one embodiment, to calculate the desired lateral acceleration ($A_{y_{des}}$) the controller is configured to select the minimum of the ideal lateral acceleration ($A_{y_{ideal}}$) and the adjusted maximum lateral acceleration $$(A_{y_{max_{adj}}})$$

as the desired lateral acceleration $$(A_{y_{des}})(\text{e.g.}, A_{y_{des}} = \min(A_{y_{ideal}}, A_{y_{max_{adj}}})).$$

In one embodiment, to calculate the desired yaw rate ($r_{des}$) the controller is configured to select the minimum of the ideal yaw rate ($r_{ideal}$) and the adjusted maximum yaw rate ($r_{max_{adj}}$) as the desired yaw rate ($r_{des}$) (e.g., $r_{des}=\min(r_{ideal}, r_{max_{adj}})$).

In one embodiment, the adjusted maximum lateral acceleration $$(A_{y_{max_{adj}}})$$

equals the maximum lateral acceleration ($A_{y_{max}}$) multiplied by the correction factor ($\mu_e$)

$$\left(\text{e.g.}, A_{y_{max_{adj}}} = A_{y_{max}}\mu_e\right).$$

In one embodiment, the adjusted maximum yaw rate ($r_{max_{adj}}$) equals the maximum yaw rate ($r_{max}$) multiplied by the correction factor ($\mu_e$).

In another embodiment, a method in a vehicle for exercising motion control is provided. The method includes: calculating a correction factor (multiplier) using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state. The method further includes adjusting a desired lateral acceleration and a desired yaw rate by applying the correction factor to account for a reduced level of friction experienced by the vehicle when traveling on a non-ideal friction surface (e.g., wet road, low friction surface) when the vehicle is performing a limit handling maneuver; calculating optimal control actions based on the adjusted desired lateral acceleration and adjusted desired yaw rate; and applying the optimal control actions with vehicle actuators during vehicle operations.

In one embodiment, the method further includes determining whether the vehicle is experiencing an understeer, oversteer, or normal steer condition based on calculating an understeer angle for the vehicle.

In one embodiment, the understeer angle is determined based on the difference between a front lateral slip angle $\alpha_f$ and a rear lateral slip angle $\alpha_r$ for the vehicle.

In one embodiment, the method further includes determining whether the vehicle is experiencing an understeer, oversteer, or normal steer condition based on front axle and rear axle saturation detection.

In one embodiment, the first set of operations includes calculating the correction factor ($\mu_e$) based on:

$$\mu_e = \frac{F_{y_f}}{F_{y_{max_f}}}$$

wherein $F_{y_f}$ includes the lateral force applied to the front axle, and $$F_{y_{max_f}}$$

includes the maximum lateral force that both front tires (front left and front right tires) together can generate.

In one embodiment, the second set of operations includes calculating the correction factor ($\mu_e$) based on:

$$\mu_e = \frac{F_{y_r}}{F_{y_{max_r}}}$$

wherein $F_{y_r}$ includes the lateral force applied to the rear axle, and $$F_{y_{max_r}}$$

includes the maximum lateral force that both rear tires (rear left and rear right tires) together can generate.

In one embodiment, the third set of operations includes calculating the factor ($\mu_e$) based on:

$$\mu_e = \frac{F_{y_f} + F_{y_r}}{F_{y_{max_f}} + F_{y_{max_r}}}$$

wherein $F_{y_f}$ includes the lateral force applied to the front axle, $$F_{y_{max_f}}$$

includes the maximum lateral force that both front tires (front left and front right tires) together can generate, $F_{y_r}$ includes the lateral force applied to the rear axle, and $$F_{y_{max_r}}$$

includes the maximum lateral force that both rear tires (rear left and rear right tires) together can generate.

In one embodiment, adjusting the desired lateral acceleration and the desired yaw rate includes: receiving driver steering and acceleration inputs while the vehicle is operated; calculating an ideal lateral acceleration ($A_{y_{ideal}}$) and an ideal yaw rate ($r_{ideal}$) based on the steering and acceleration inputs, a vehicle model, and a tire model; calculating a maximum lateral acceleration ($A_{y_{max}}$) and a maximum yaw rate ($r_{max}$) based on the tire model; generating an adjusted maximum lateral acceleration $$\left(A_{y_{max_{adj}}}\right)$$

by applying the correction factor ($\mu_e$) to the maximum lateral acceleration ($A_{y_{max}}$); generating an adjusted maximum yaw rate ($\mu_{max_{adj}}$) by applying the correction factor ($\mu_e$) to the maximum yaw rate ($r_{max}$); calculating the desired lateral acceleration ($A_{y_{des}}$) based on the ideal lateral acceleration ($A_{y_{ideal}}$) and the adjusted maximum lateral acceleration $$\left(A_{y_{max_{adj}}}\right);$$

and calculating the desired yaw rate ($r_{des}$) based on the ideal yaw rate ($r_{ideal}$) and the adjusted maximum yaw rate ($r_{max_{adj}}$).

In one embodiment, calculating the desired lateral acceleration ($A_{y_{des}}$) includes selecting the minimum of the ideal lateral acceleration ($A_{y_{ideal}}$) and the adjusted maximum lateral acceleration $$\left(A_{y_{max_{adj}}}\right)$$

as the desired lateral acceleration ($A_{y_{des}}$)

$$\left(\text{e.g., } A_{y_{des}} = \min\left(A_{y_{ideal}}, A_{y_{max_{adj}}}\right)\right).$$

In one embodiment, calculating the desired yaw rate ($r_{des}$) includes selecting the minimum of the ideal yaw rate ($r_{ideal}$) and the adjusted maximum yaw rate ($r_{max_{adj}}$) as the desired yaw rate ($r_{des}$) (e.g., $r_{des}=\min(r_{ideal}, r_{max_{adj}})$).

In one embodiment, the adjusted maximum lateral acceleration $$\left(A_{y_{max_{adj}}}\right)$$

equals the maximum lateral acceleration ($A_{y_{max}}$) multiplied by the correction factor ($\mu_e$)

$$\left(\text{e.g., } A_{y_{max_{adj}}} = A_{y_{max}} \mu_e\right).$$

In one embodiment, the adjusted maximum yaw rate ($r_{max_{adj}}$) equals the maximum yaw rate ($r_{max}$) multiplied by the correction factor ($\mu_e$) (e.g., $r_{max_{adj}}=r_{max}\mu_e$).

In another embodiment, a non-transitory computer readable media encoded with programming instructions configurable to cause a controller in a vehicle to perform a method is provided. The method includes: calculating a correction factor (multiplier) using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state. The method further includes adjusting a desired lateral acceleration and a desired yaw rate by applying the correction factor to account for a reduced level of friction experienced by the vehicle when traveling on a non-ideal friction surface (e.g., wet road, low friction surface) when the vehicle is performing a limit handling maneuver; calculating optimal control actions based on the adjusted desired lateral acceleration and adjusted desired yaw rate; and applying the optimal control actions with vehicle actuators during vehicle operations.

In one embodiment, the method further includes determining whether the vehicle is experiencing an understeer, oversteer, or normal steer condition based on calculating an understeer angle for the vehicle.

In one embodiment, the understeer angle is determined based on the difference between a front lateral slip angle $\mu_f$ and a rear lateral slip angle $\alpha_r$ for the vehicle.

In one embodiment, the method further includes determining whether the vehicle is experiencing an understeer, oversteer, or normal steer condition based on front axle and rear axle saturation detection.

In one embodiment, the first set of operations includes calculating the correction factor ($\mu_e$) based on:

$$\mu_e = \frac{F_{y_f}}{F_{y_{max_f}}}$$

wherein $F_{y_f}$ includes the lateral force applied to the front axle, and $$F_{y_{max_f}}$$

includes the maximum lateral force that both front tires (front left and front right tires) together can generate.

In one embodiment, the second set of operations includes calculating the correction factor ($\mu_e$) based on:

$$\mu_e = \frac{F_{y_r}}{F_{y_{max_r}}}$$

wherein $F_{y_r}$ includes the lateral force applied to the rear axle, and $$F_{y max_r}$$

includes the maximum lateral force that both rear tires (rear left and rear right tires) together can generate.

In one embodiment, the third set of operations includes calculating the factor ($\mu_e$) based on:

$$\mu_e = \frac{F_{y_f} + F_{y_r}}{F_{y max_f} + F_{y max_r}}$$

wherein $F_{y_f}$ includes the lateral force applied to the front axle, $$F_{y max_f}$$

includes the maximum lateral force that both front tires (front left and front right tires) together can generate, $F_{y_r}$ includes the lateral force applied to the rear axle, and $$F_{y max_r}$$

includes the maximum lateral force that both rear tires (rear left and rear right tires) together can generate.

In one embodiment, adjusting the desired lateral acceleration and the desired yaw rate includes: receiving driver steering and acceleration inputs while the vehicle is operated; calculating an ideal lateral acceleration ($A_{y_{ideal}}$) and an ideal yaw rate ($r_{ideal}$) based on the steering and acceleration inputs, a vehicle model, and a tire model; calculating a maximum lateral acceleration ($A_{y_{max}}$) and a maximum yaw rate ($r_{max}$) based on the tire model; generating an adjusted maximum lateral acceleration $$\left( A_{y max_{adj}} \right)$$

by applying the correction factor ($\mu_e$) to the maximum lateral acceleration ($A_{y_{max}}$); generating an adjusted maximum yaw rate ($r_{max_{adj}}$) by applying the correction factor ($\mu_e$) to the maximum yaw rate ($r_{max}$); calculating the desired lateral acceleration ($A_{y_{des}}$) based on the ideal lateral acceleration ($A_{y_{ideal}}$) and the adjusted maximum lateral acceleration $$\left( A_{y max_{adj}} \right);$$

and calculating the desired yaw rate ($r_{des}$) based on the ideal yaw rate ($r_{ideal}$) and the adjusted maximum yaw rate ($r_{max_{adj}}$).

In one embodiment, calculating the desired lateral acceleration ($A_{y_{des}}$) includes selecting the minimum of the ideal lateral acceleration ($A_{y_{ideal}}$) and the adjusted maximum lateral acceleration $$\left( A_{y max_{adj}} \right)$$

as the desired lateral acceleration ($A_{y_{des}}$)

$$\left( \text{e.g., } A_{y_{des}} = \min\left( A_{y_{ideal}}, A_{y max_{adj}} \right) \right).$$

In one embodiment, calculating the desired yaw rate ($r_{des}$) includes selecting the minimum of the ideal yaw rate ($r_{ideal}$) and the adjusted maximum yaw rate ($r_{max_{adj}}$) as the desired yaw rate ($r_{des}$) (e.g., $r_{des}=\min(r_{ideal}, r_{max_{adj}})$).

In one embodiment, the adjusted maximum lateral acceleration $$\left( A_{y max_{adj}} \right)$$

equals the maximum lateral acceleration ($A_{y_{max}}$) multiplied by the correction factor ($\mu_e$)

$$\left( \text{e.g., } A_{y max_{adj}} = A_{y max} \mu_e \right).$$

In one embodiment, the adjusted maximum yaw rate ($r_{max_{adj}}$) equals the maximum yaw rate ($r_{max}$) multiplied by the correction factor ($\mu_e$) (e.g., $r_{max_{adj}} = r_{max} \mu_e$).

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
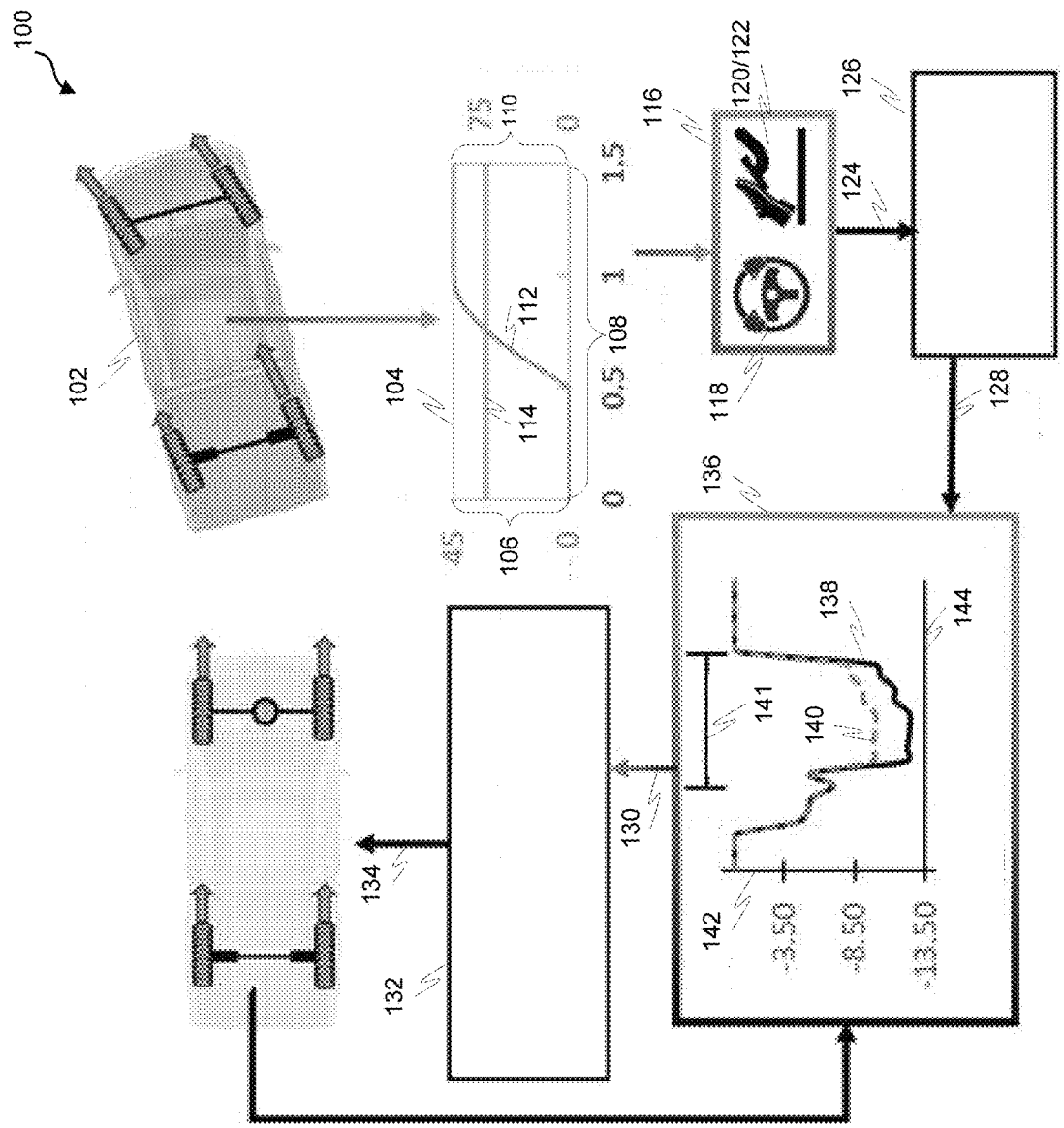
FIG. 1 is a block diagram depicting an example vehicle environment wherein a vehicle motion control system applies a variable correction factor ($\mu_e$) during a limit handling maneuver to adjust a desired lateral acceleration ($A_{y_{des}}$) and a desired yaw rate ($r_{des}$) in advance of computing control actions to send to vehicle actuators to control the vehicle during the limit handling maneuver, in accordance with an embodiment.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In limit handling maneuvers, a Driver Command Interpreter (DCI) aims to achieve maximum lateral grip by calculating desired dynamics. The DCI, however, works based on the assumption of a dry road condition. With such assumption, vehicle motion control can potentially push a vehicle beyond tire capacities. The subject matter described herein discloses apparatus, systems, techniques, and articles for providing a limit handling adjustment controller to correct limit handling desired dynamics in low-friction surfaces.

The following disclosure describes apparatus, systems, techniques, and articles for enhancing estimated maximum lateral acceleration and yaw rate in limit handling maneuvers on low-friction surfaces. This can allow for higher reliability in a vehicle motion control system. When maximum lateral motions are estimated for dry road conditions, maximum lateral motions can be overestimated when a vehicle travels on low friction surfaces. The following disclosure describes apparatus, systems, techniques, and articles for correcting the estimated maximum lateral acceleration and yaw rate in limit handling maneuvers when on low-friction surfaces. The following disclosure describes apparatus, systems, techniques, and articles for providing vehicle motion control systems with higher reliability. The following disclosure describes apparatus, systems, techniques, and articles for enhanced estimation of maximum lateral motion ($A_{y_{max}}$ and $r_{max}$) for limit handling events for low friction surfaces. This can be accomplished by providing an adjustment factor (multiplier) to correct current estimations which are calculated with the assumption of a dry road.

FIG. 1 is a block diagram depicting an example vehicle environment 100 wherein a vehicle motion control system applies a variable correction factor ($\mu_e$) during a limit handling maneuver to adjust a desired lateral acceleration ($A_{y_{des}}$) and a desired yaw rate ($r_{des}$) in advance of computing control actions to send to vehicle actuators to control the vehicle during the limit handling maneuver. A Vehicle Motion Controller (VMC) calculates optimal control actions based on desired and maximum lateral motions ($A_y$, r), provided by a Driver Command Interpreter (DCI). Maximum lateral motions are obtained under the assumption that the vehicle is driving on a dry road. When the vehicle is driving on a low friction surface, the assumption can result in an overestimation of maximum lateral motions and thus suboptimal control performance in limit handling. The example vehicle motion control system adjusts the maximum lateral acceleration ($A_{y_{max}}$) and the maximum yaw rate ($r_{max}$) during limit handling. These adjustments can improve the VMC performance.

Depicted is an example vehicle 102 that is engaged in a limit handling maneuver. In this example, as illustrated in the example graph 104 having a steering wheel angle (SWA) axis 106, a time axis 108, and a throttle axis 110, the SWA 112 of the vehicle 102 changes rapidly while the throttle level 114 remains constant. A driver may attempt to make driving adjustments during the limit handling maneuver via driver input devices 116 such as the steering wheel 118 and a brake pedal 120 and/or acceleration pedal 122 that communicate driver commands 124 to, among other things, a driver command interpreter (DCI) 126.

The DCI 126 generates desired longitudinal and lateral forces 128 and the vehicle's yaw moment based on the driver commands 124 and an assumed dry road condition for the stability control system of the vehicle. The generated forces 128 include an ideal lateral acceleration ($A_{y_{ideal}}$), a maximum lateral acceleration ($A_{y_{max}}$) an ideal yaw rate ($r_{ideal}$), and a maximum yaw rate ($r_{max}$). A controller 132 (e.g., the vehicle motion controller 132), which is in charge of correcting and stabilizing the vehicle by changing the torque in each wheel, computes optimal control actions 134 based on input signals 130 for controlling actuators that control vehicle motion. The input signals 130 are generated by a limit handling adjustment controller 136 based on the ideal lateral acceleration ($A_{y_{ideal}}$), the maximum lateral acceleration ($A_{y_{max}}$), the ideal yaw rate ($r_{ideal}$), and the maximum yaw rate ($r_{max}$).

The limit handling adjustment controller 136 calculates a correction factor ($\mu_e$) to account for a reduced level of friction experienced by the vehicle when traveling on a non-ideal friction surface (e.g., wet road, low friction surface) when the vehicle is performing a limit handling maneuver. The limit handling adjustment controller 136 adjusts the desired lateral acceleration ($A_{y_{des}}$) and the desired yaw rate ($r_{des}$) by applying the correction factor ($\mu_e$) to the ideal lateral acceleration ($A_{y_{ideal}}$) and the ideal yaw rate ($r_{ideal}$) to account for a reduced level of friction experienced by the vehicle when traveling on a non-ideal friction surface (e.g., wet road, low friction surface) when the vehicle is performing a limit handling maneuver.

As illustrated in the block representing the limit handling adjustment controller 136, a desired lateral acceleration ($A_{y_{des}}$) 138 may be adjusted as illustrated to an adjusted desired lateral acceleration 140 during an active adjustment period of time 141 during which the vehicle is experiencing a limit handling maneuver. The example graph illustrated in the block 136 has a lateral acceleration axis 142 and a time axis 144, and shows the desired lateral acceleration ($A_{y_{des}}$) 138 and the adjusted desired lateral acceleration 140 plotted against time. Also, the desired yaw rate ($r_{des}$) (not shown) may be adjusted to an adjusted desired yaw rate (not shown) during the active adjustment period of time 141 during which the vehicle is experiencing a limit handling maneuver. Although the limit handling adjustment controller 136 is shown in this example as being separate from a DCI, in other examples, the limit handling adjustment controller 136 is part of a DCI.

Figure 2:
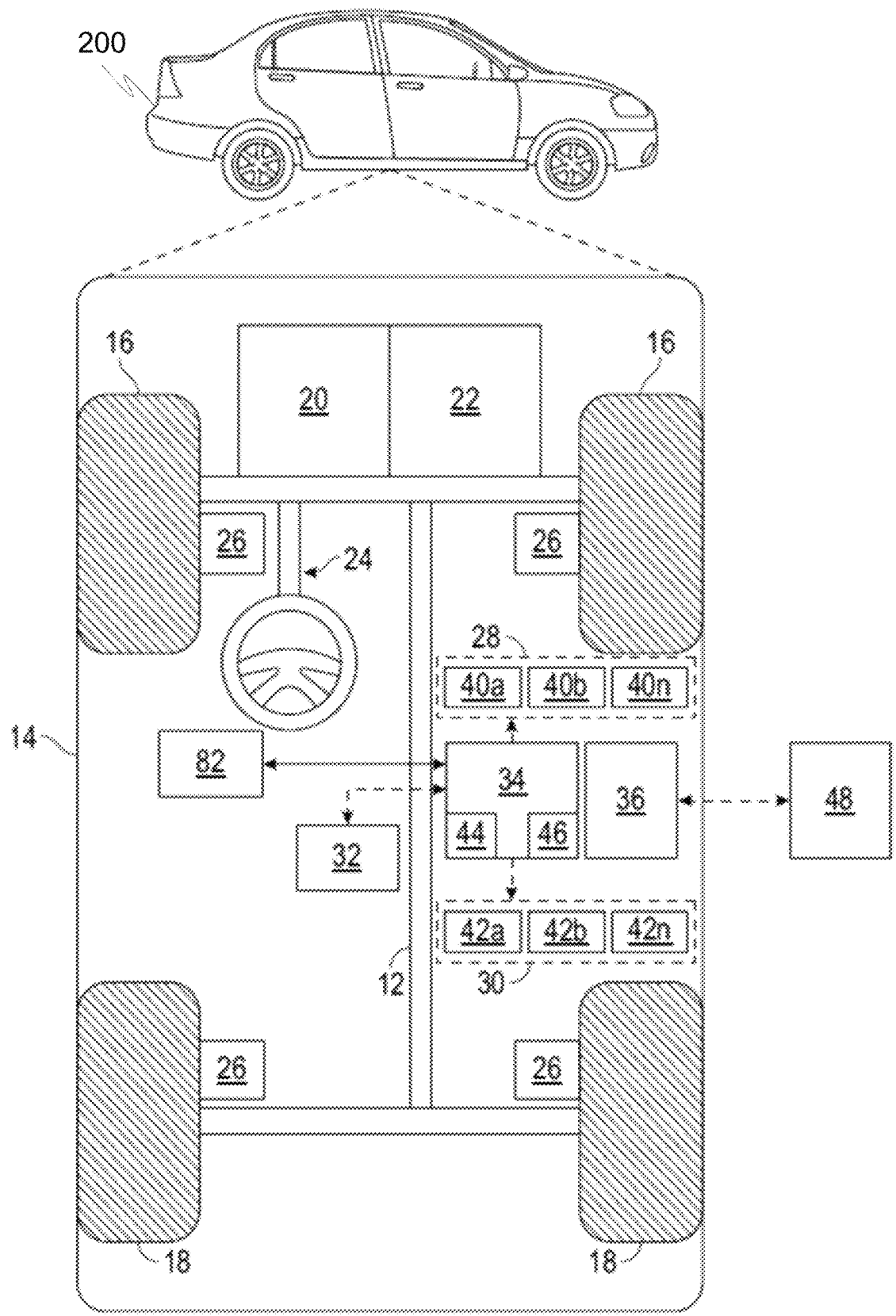
FIG. 2 is a block diagram depicting an example vehicle that may apply a variable correction factor ($\mu_e$) during a limit handling maneuver to adjust a desired lateral acceleration ($A_{y_{des}}$) and a desired yaw rate ($r_{des}$) in advance of computing control actions to send to vehicle actuators to control the vehicle during the limit handling maneuver, in accordance with an embodiment.

FIG. 2 is a block diagram depicting an example vehicle 200 that may apply a variable correction factor ($\mu_e$) during a limit handling maneuver to adjust a desired lateral acceleration ($A_{y_{des}}$) and a desired yaw rate ($r_{des}$) in advance of computing control actions to send to vehicle actuators to control the vehicle during the limit handling maneuver. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including trucks, sport utility vehicles (SUVs), recreational vehicles (RVs), etc., may also be used. The vehicle 200 may be capable of being driven manually, autonomously and/or semi-autonomously.

The vehicle 200 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48.

The sensor system 28 includes one or more sensing devices 40a-40n that sense observable conditions of the exterior environment and/or the interior environment of the autonomous vehicle 10. The sensing devices 40a-40n can include but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26.

The communication system 36 is configured to wirelessly communicate information to and from other entities 48, such as but not limited to, other vehicles ("V2V" communication) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 2, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 200 to apply a variable correction factor ($\mu_e$) during a limit handling maneuver to adjust a desired lateral acceleration ($A_{y_{des}}$) and a desired yaw rate ($r_{des}$) in advance of computing control actions to send to vehicle actuators to control the vehicle during the limit handling maneuver.

Planar body dynamics for a vehicle in motion can be computed as follows:

$$\dot{v}_x = ((F_{x_1}+F_{x_2})\cos\delta_f - (F_{y_1}+F_{y_2})\sin\delta_f)/m + ((F_{x_3}+F_{x_4})\cos\delta_r - (F_{y_3}+F_{y_4})\sin\delta_r)/m + rv_y$$

$$\dot{v}_y = ((F_{x_1}+F_{x_2})\sin\delta_f + (F_{y_1}+F_{y_2})\cos\delta_f)/m + ((F_{x_3}+F_{x_4})\sin\delta_r + (F_{y_3}+F_{y_4})\cos\delta_r)/m - rv_x$$

$$\dot{r} = (L_f(F_{y_1}+F_{y_2})+L_{w_f}(F_{x_2}-F_{x_1}))\cos\delta_f/I_{zz} + (L_f(F_{x_1}+F_{x_2}) + L_{w_f}(F_{y_2}-F_{y_1}))\sin\delta_f/I_{zz} - (L_r(F_{y_3}+F_{y_4})+L_{w_r}(F_{x_4}-F_{x_3}))\cos\delta_r/I_{zz} - (L_r(F_{x_3}+F_{x_4})+L_{w_r}(F_{y_4}-F_{y_3}))\sin\delta_r/I_{zz}$$

wherein $\dot{v}_x$ is the time derivative of the longitudinal velocity; $\dot{v}_y$ is the time derivative of the lateral velocity; r is the time derivative yaw rate (also known as yaw acceleration); $F_{x_1}$ is the longitudinal tire force in tire 1 (front left tire); $F_{x_2}$ is the longitudinal tire force in tire 2 (front right tire); $\delta_f$ is the road wheel angle of the front wheels; $F_{y_1}$ is the lateral tire force in tire 1 (front left tire); $F_{y_2}$ is the lateral tire force in tire 2 (front right tire); m is the vehicle mass; $F_{x_3}$ is the longitudinal tire force in tire 3 (rear left tire); $F_{x_4}$ is the longitudinal tire force in tire 4 (rear right tire); $\delta_r$ is the road wheel angle of the rear wheels; $F_{y_3}$ is the lateral tire force in tire 3 (rear left tire); $F_{y_4}$ is the lateral tire force in tire 4 (rear right tire); r is the yaw rate; $v_y$ is the lateral velocity; $v_x$ is the longitudinal velocity; $L_f$ is the distance between the center of gravity and the front axle; $L_{w_f}$ is the front axle track; $I_{zz}$ is the moment of inertia around the z (vertical) axis; $L_r$ is the distance between the center of gravity and the rear axle; and $L_{w_r}$ is the rear axle track.

Tire force calculations (for each corner of the vehicle) can be computed as follows:

Longitudinal slip ratio:

$$\lambda_i = \frac{R_{e_i}\omega_i - V_{xc_i}}{V_{xc_i}}, i = 1:4$$

Lateral slip angle (front):

$$\alpha_f = \delta_f - \frac{V_y + l_f r}{V_x}$$

Lateral slip angle (rear):

$$\alpha_r = \delta_r - \frac{V_y - l_r r}{V_x}$$

The normal force (vertical tire force), longitudinal slip ratio, and lateral slip angle, when applied as inputs to a tire model (empirical or analytical) produces $F_y$ and $F_x$.

The maximum lateral acceleration is achieved when both axles are saturated simultaneously and there is no unused capacity at axles. Assuming a high friction surface:

$$F_{y_{max_f}} = F_{y_{max_{FL}}} + F_{y_{max_{FR}}}$$

$$F_{y_{max_r}} = F_{y_{max_{RL}}} + F_{y_{max_{RR}}}$$

wherein $$F_{y_{max_f}}$$

is the maximum tire force in the front axle in the lateral (y) direction that the front tires can generate;

$$F_{y_{max_{FL}}}$$

is the maximum force that the front left tire can generate in the lateral (y) direction;

$$F_{y_{max_{FR}}}$$

is the maximum force that the front right tire can generate in the lateral (y) direction;

$$F_{y_{max_r}}$$

is the maximum tire force in the rear axle in the lateral (y) direction that the rear tires can generate;

$$F_{y_{max_{RL}}}$$

is the maximum force that the rear left tire can generate in the lateral (y) direction;

$$F_{y_{max_{RR}}}$$

is the maximum force that the rear right tire can generate in the lateral (y) direction.

This leads to the following maximum lateral acceleration ($a_{y_{max}}$) and maximum yaw rate ($r_{max}$) equations:

$$a_{y_{max}} = \frac{\left(F_{y_{max_f}}\cos\delta_f + F_{y_{max_r}}\cos\delta_r\right)}{m}$$

$$r_{max} = \frac{a_{y_{max}}}{v_x}$$

Target states based on a steady state response of a linear model plus dynamic filters can be approximated using the following equations:

$$\Omega_{gain} = \frac{V_x}{(l_f + l_r) + k_{us}V_x^2}$$

ideal yaw rate: $r_{ideal} = \Omega_{gain}\delta_f$
ideal lateral acceleration: $A_{y_{ideal}} = \Omega_{gain}\delta_f V_x$
where $K_{us}$ is the understeer coefficient and in ideal tires its value becomes zero.

On a dry road, the desired lateral motions are:
desired yaw rate: $r_{des} = \min(r_{ideal}, r_{max})$; and
desired lateral acceleration: $A_{y_{des}} = \min(A_{y_{ideal}}, A_{y_{max}})$.

Note that the sign of the desired yaw rate ($r_{des}$) and the desired lateral acceleration ($A_{y_{des}}$) are defined based on direction of motion.

Based on the steering condition a multiplier ($\mu_e$) is calculated to adjust the maximum lateral acceleration ($a_{y_{max}}$) and the maximum yaw rate ($r_{max}$). The maximum lateral acceleration ($a_{y_{max}}$) and the maximum yaw rate ($r_{max}$) are only corrected for limit handing maneuvers.

The motion control system is configured to calculate a correction factor (multiplier) to account for a reduced level of friction experienced by the vehicle when traveling on a non-ideal friction surface (e.g., wet road, low friction surface) when the vehicle is performing a limit handling maneuver using one of three different sets of operations. The correction factor is calculated using a first set of operations when the vehicle is operating in an understeer state, calculated using a second set of operations when the vehicle is operating in an oversteer state, and calculated using a third set of operations when the vehicle is operating in a neutral steer state.

The motion control system can determine whether the vehicle is experiencing an understeer, oversteer, or normal steer condition based on calculating an understeer angle for the vehicle. The understeer angle can be determined based on the difference between a front lateral slip angle $\alpha_f$ and a rear lateral slip angle $\alpha_r$ for the vehicle. Alternatively and/or additionally, the motion control system may determine whether the vehicle is experiencing an understeer, oversteer, or normal steer condition based on front axle and rear axle saturation detection.

The first set of operations comprises calculating the correction factor ($\mu_e$) based on:

$$\mu_e = \frac{F_{y_f}}{F_{y_{max_f}}}$$

wherein $F_{y_f}$ comprises the lateral force applied to the front axle, and $$F_{y_{max_f}}$$

comprises the maximum lateral force that both front tires (front left and front right tires) together can generate.

The second set of operations comprises calculating the correction factor ($\mu_e$) based on:

$$\mu_e = \frac{F_{y_r}}{F_{y_{max_r}}}$$

wherein $F_{y_r}$ comprises the lateral force applied to the rear axle, and $$F_{y_{max_r}}$$

comprises the maximum lateral force that both rear tires (rear left and rear right tires) together can generate.

The third set of operations comprises calculating the factor ($\mu_e$) based on:

$$\mu_e = \frac{F_{y_f} + F_{y_r}}{F_{y_{max_f}} + F_{y_{max_r}}}$$

wherein $F_{y_f}$ comprises the lateral force applied to the front axle, $$F_{y_{max_f}}$$

comprises me maximum lateral force that both front tires (front left and front right tires) together can generate, $F_{y_r}$ comprises the lateral force applied to the rear axle, and $$F_{y_{max_r}}$$

comprises the maximum lateral force that both rear tires (rear left and rear right tires) together can generate.

The motion control system can adjust a desired lateral acceleration ($A_{y_{des}}$) and a desired yaw rate ($r_{des}$) by applying the correction factor ($\mu_e$) to account for a reduced level of friction experienced by the vehicle when traveling on a non-ideal friction surface (e.g., wet road, low friction surface) when the vehicle is performing a limit handling maneuver.

To adjust a desired lateral acceleration ($A_{y_{des}}$) and a desired yaw rate ($r_{des}$) by applying the correction factor ($\mu_e$), the motion control system can generate an adjusted maximum lateral acceleration $$\left(A_{y_{max_{adj}}}\right)$$

by applying tile collection factor ($\mu_e$) to the maximum lateral acceleration ($A_{y_{max}}$); generate an adjusted maximum yaw rate ($r_{max_{adj}}$) by applying the correction factor ($\mu_e$) to the maximum yaw rate ($r_{max}$); calculate the desired lateral acceleration ($A_{y_{des}}$) based on the ideal lateral acceleration ($A_{y_{ideal}}$) and the adjusted maximum lateral acceleration $$\left(A_{y_{max_{adj}}}\right);$$

and calculate the desired yaw rate ($r_{des}$) based on the ideal yaw rate ($r_{ideal}$) and the adjusted maximum yaw rate ($r_{max_{adj}}$).

To calculate the desired lateral acceleration ($A_{y_{des}}$) the motion control system can select the minimum of the ideal lateral acceleration ($A_{y_{ideal}}$) and the adjusted maximum lateral acceleration $$\left(A_{y_{max_{adj}}}\right)$$

as the desired lateral acceleration ($A_{y_{des}}$)

$$\left(\text{e.g., } A_{y_{des}} = \min\left(A_{y_{ideal}}, A_{y_{max_{adj}}}\right)\right).$$

To calculate the desired yaw rate ($r_{des}$), the motion control system can select the minimum of the ideal yaw rate ($r_{ideal}$) and the adjusted maximum yaw rate ($r_{max_{adj}}$) as the desired yaw rate ($r_{des}$) (e.g., $r_{des}=\min(r_{ideal}, r_{max_{adj}})$).

To calculate the adjusted maximum lateral acceleration $$\left(A_{y_{max_{adj}}}\right),$$

the motion control system can multiply the maximum lateral acceleration ($A_{y_{max}}$) by the correction factor ($\mu_e$)

$$\left(\text{e.g., } A_{y_{max_{adj}}} = A_{y_{max}}\mu_e\right).$$

To calculate the adjusted maximum yaw rate ($r_{max_{adj}}$), the motion control system can multiply the maximum yaw rate ($r_{max}$) by the correction factor ($\mu_e$) (e.g., $r_{max_{adj}}=r_{max}\mu_e$).

Figure 3:
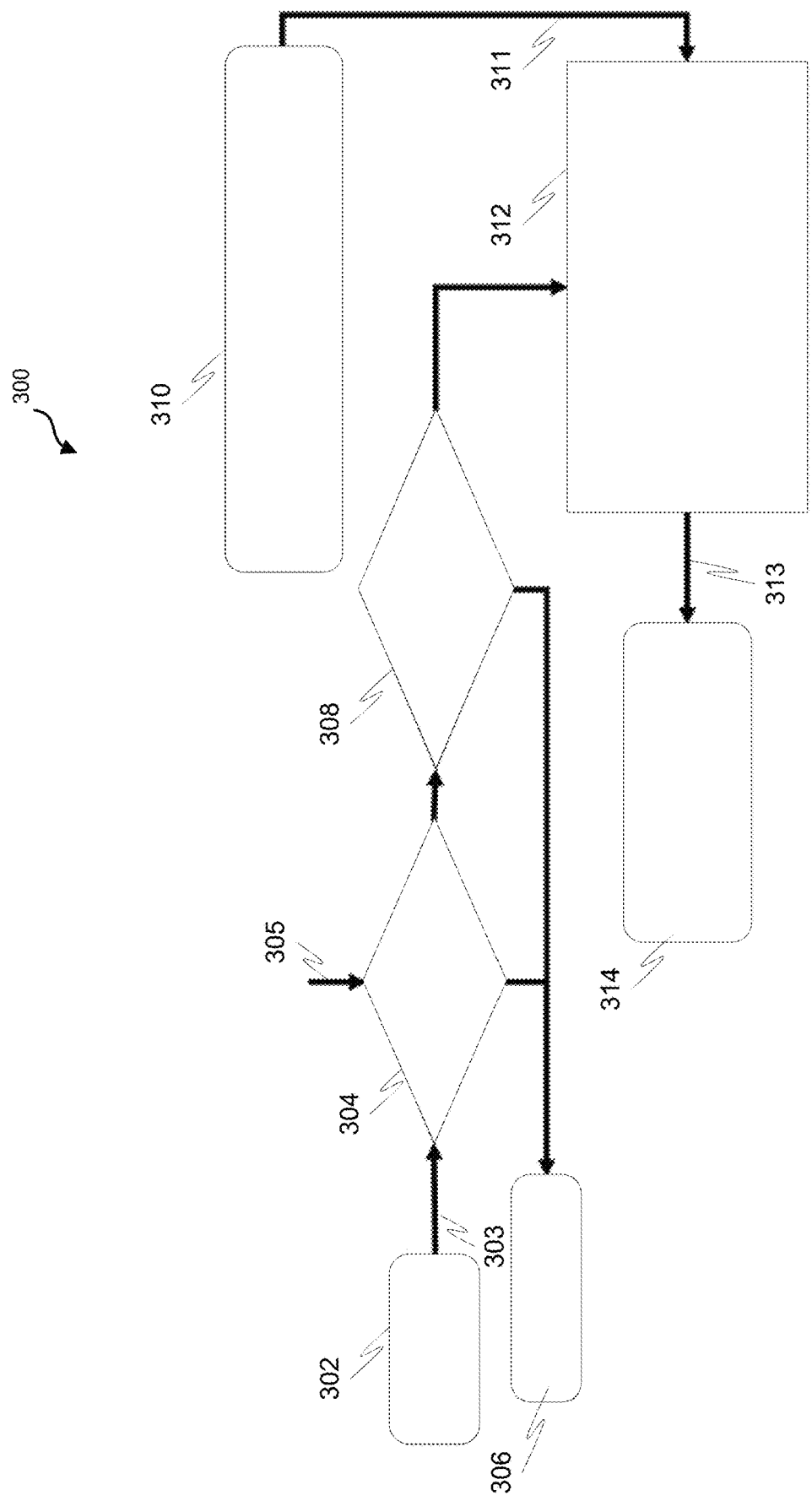
FIG. 3 is a process flow chart depicting an example process 300 for calculating and applying a multiplier ($\mu_e$) in a vehicle motion control system, in accordance with an embodiment.

FIG. 3 is a process flow chart depicting an example process 300 for calculating and applying a multiplier ($\mu_e$) in a vehicle motion control system. The order of operation within process 300 is not limited to the sequential execution as illustrated in the FIG. 3 but may be performed in one or more varying orders as applicable and in accordance with the present disclosure.

The example process 300 includes a DCI in a vehicle motion control system calculating an ideal lateral acceleration ($A_{y_{ideal}}$) and an ideal yaw rate ($r_{ideal}$) (operation 302) and the vehicle motion control system comparing the ideal lateral acceleration ($A_{y_{ideal}}$) 303 to a measured lateral acceleration ($A_y$) 305 to determine if the difference is greater than a threshold level (decision 304). If it is determined that the difference is not greater than a threshold level (no at decision 304), then no correction is made (operation 306). If it is determined that the difference is greater than a threshold level (yes at decision 304), then it is determined if other enablement criteria are met for generating and applying a correction factor (decision 308). The other enablement criteria includes whether the vehicle is in a limit handling condition. Other enablement criteria may also be established.

If it is determined that the other enablement criteria are not met (no at decision 308), then no correction is made (operation 306). If it is determined that the other enablement criteria are met (yes at decision 308), then example process 300 includes determining the steering condition 311 of the vehicle (e.g., whether the vehicle is experiencing an understeer, oversteer, or normal steer condition) (operation 310). Determining the steering condition 311 of the vehicle may involve calculating an understeer angle based on the difference between the front lateral slip angle $\alpha_f$ and the rear lateral slip angle $\alpha_r$ (e.g., $\beta_f$-$\alpha_r$). Alternatively and/or additionally, determining the steering condition 311 of the vehicle may be based on front axle and rear axle saturation detection.

The example process 300 includes calculating a correction factor ($\mu_e$) 313 based on the steering condition (operation 312). The correction factor ($\mu_e$) 313 is calculated using a first set of operations when the vehicle is operating in an understeer state, calculated using a second set of operations when the vehicle is operating in an oversteer state, and calculated using a third set of operations when the vehicle is operating in a neutral steer state. The first set of operations may comprise calculating the correction factor ($\mu_e$) based on:

$$\mu_e = \frac{F_{y_f}}{F_{y_{max_f}}}$$

wherein $F_{y_f}$ comprises the lateral force applied to the front axle, and $$F_{y_{max_f}}$$

comprises the maximum lateral force that both front tires (front left and front right tires) together can generate. The second set of operations may comprise calculating the correction factor ($\mu_e$) based on:

$$\mu_e = \frac{F_{y_r}}{F_{y_{max_r}}}$$

wherein $F_{y_r}$ comprises the lateral force applied to the rear axle, and $$F_{y_{max_r}}$$

comprises the maximum lateral force that both rear tires (rear left and rear right tires) together can generate. The third set of operations may comprise calculating the factor ($\mu_e$) based on:

$$\mu_e = \frac{F_{y_f} + F_{y_r}}{F_{y_{max_f}} + F_{y_{max_r}}}$$

wherein $F_{y_f}$ comprises the lateral force applied to the front axle, $$F_{y_{max_f}}$$

comprises the maximum lateral force that both front tires (front left and front right tires) together can generate, $F_{y_r}$ comprises the lateral force applied to the rear axle, and $$F_{y_{max_r}}$$

comprises the maximum lateral force that both rear tires (rear left and rear right tires) together can generate.

The example process 300 includes calculating an adjusted maximum lateral acceleration $$\left(A_{y_{max_{adj}}}\right)$$

and an adjusted maximum yaw rate ($r_{max_{adj}}$) (operation 314). Calculating an adjusted maximum lateral acceleration $$\left(A_{y_{max_{adj}}}\right)$$

may involve applying the correction factor ($\mu_e$) to the maximum lateral acceleration ($A_{y_{max}}$), for example by multiplying the maximum lateral acceleration ($A_{y_{max}}$) by the correction factor ($\mu_e$)

$$\left(\text{e.g., } A_{y_{max_{adj}}} = A_{y_{max}}\mu_e\right).$$

Calculating an adjusted maximum yaw rate ($r_{max_{adj}}$) may involve applying the correction factor ($\mu_e$) to the maximum yaw rate ($r_{max}$), for example by multiplying the maximum yaw rate ($r_{max}$) by the correction factor ($\mu_e$) (e.g., $r_{max_{adj}} = r_{max}\mu_e$). The adjusted maximum lateral acceleration $$\left(A_{y_{max_{adj}}}\right)$$

and the adjusted maximum yaw rate ($r_{max_{adj}}$) may be used to determine a desired lateral acceleration ($A_{y_{des}}$) and a desired yaw rate ($r_{des}$).

Figure 4:
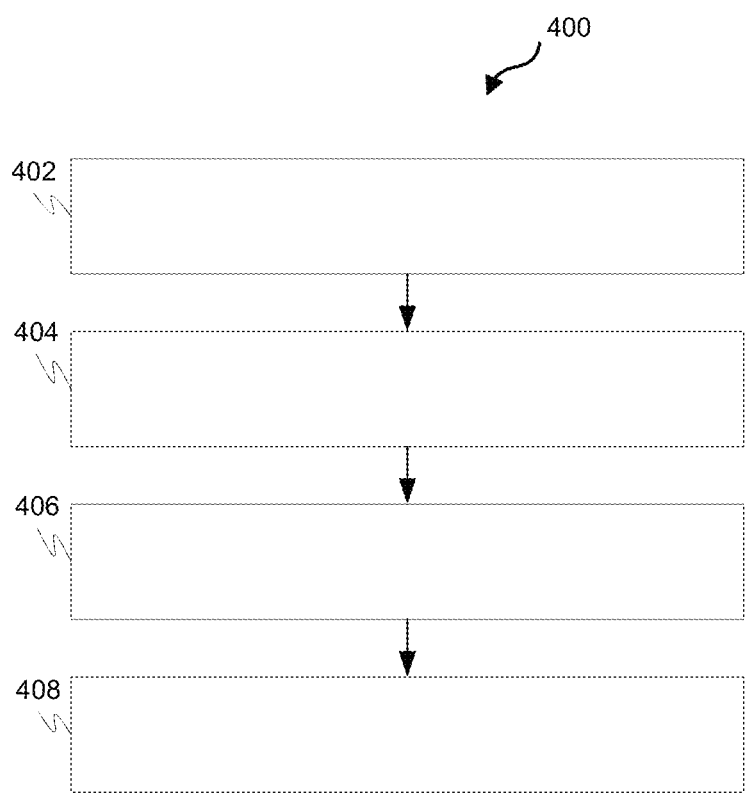
FIG. 4 is a process flow chart depicting an example process 300 for calculating and applying a multiplier ($\mu_e$) in a vehicle motion control system, in accordance with an embodiment.

FIG. 4 is a process flow chart depicting an example process in a motion control system in a vehicle. The order of operation within process 400 is not limited to the sequential execution as illustrated in the FIG. 4 but may be performed in one or more varying orders as applicable and in accordance with the present disclosure.

The example process 400 includes calculating a correction factor (multiplier) when the vehicle is performing a limit handling maneuver (operation 402). The correction factor may be calculating using one of three different sets of operations. The correction factor may be calculated using a first set of operations when the vehicle is operating in an understeer state, calculated using a second set of operations when the vehicle is operating in an oversteer state, and calculated using a third set of operations when the vehicle is operating in a neutral steer state.

The example process 400 includes adjusting a desired lateral acceleration and a desired yaw rate by applying the correction factor (operation 404). The correction factor is applied to account for a reduced level of friction experienced by the vehicle when traveling on a non-ideal friction surface (e.g., wet road, low friction surface) when the vehicle is performing a limit handling maneuver.

Adjusting the desired lateral acceleration and the desired yaw rate by applying the correction factor may include receiving driver steering and acceleration inputs while the vehicle is operated; calculating an ideal lateral acceleration ($A_{y_{ideal}}$) and an ideal yaw rate ($r_{ideal}$) based on the steering and acceleration inputs, a vehicle model, and a tire model; calculating a maximum lateral acceleration ($A_{y_{max}}$) and a maximum yaw rate ($r_{max}$) based on the tire model; generating an adjusted maximum lateral acceleration $$(A_{y_{max_{adj}}})$$

by applying the correction factor ($\mu_e$) to the maximum lateral acceleration ($A_{y_{max}}$); generating an adjusted maximum yaw rate ($r_{max_{adj}}$) by applying the correction factor ($\mu_e$) to the maximum yaw rate ($r_{max}$); calculating the desired lateral acceleration ($A_{y_{des}}$) based on the ideal lateral acceleration ($A_{y_{ideal}}$) and the adjusted maximum lateral acceleration $$(A_{y_{max_{adj}}});$$

and calculating the desired yaw rate ($r_{des}$) based on the ideal yaw rate ($r_{ideal}$) and the adjusted maximum yaw rate ($r_{max_{adj}}$).

Calculating the desired lateral acceleration ($A_{y_{des}}$) may involve selecting the minimum of the ideal lateral acceleration ($A_{y_{ideal}}$) and the adjusted maximum lateral acceleration $$(A_{y_{max_{adj}}})$$

as the desired lateral acceleration ($A_{y_{des}}$)

$$(\text{e.g., } A_{y_{des}} = \min(A_{y_{ideal}}, A_{y_{max_{adj}}})).$$

Calculating the desired yaw rate ($r_{des}$) may involve selecting the minimum of the ideal yaw rate ($r_{ideal}$) and the adjusted maximum yaw rate ($r_{max_{adj}}$) as the desired yaw rate ($r_{des}$) (e.g., $r_{des} = \min(r_{ideal}, r_{max_{adj}})$).

Calculating the adjusted maximum lateral acceleration $$(A_{y_{max_{adj}}})$$

may involve multiplying the maximum lateral acceleration ($A_{y_{max}}$) by the correction factor ($\mu_e$)

$$(\text{e.g., } A_{y_{max_{adj}}} = A_{y_{max}} \mu_e).$$

Calculating the adjusted maximum yaw rate ($r_{max_{adj}}$) may involve multiplying the maximum yaw rate ($r_{max}$) by the correction factor ($\mu_e$) (e.g., $r_{max_{adj}} = r_{max} \mu_e$)

The example process 400 includes calculating optimal control actions based on the adjusted desired lateral acceleration and the adjusted desired yaw rate (operation 406), and applying the optimal control actions with vehicle actuators during vehicle operations (operation 408) to control the vehicle during a limit handling maneuver.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A motion control system in a vehicle, the motion control system comprising a controller, the controller configured to:
    calculate a correction factor using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state;
    wherein the first set of operations comprises calculating the correction factor ($\mu_e$) based on:

$$\mu_e = \frac{F_{y_f}}{F_{y_{max_f}}}$$

wherein $F_{y_f}$ comprises a lateral force applied to a front axle, and $F_{y_{max_f}}$ comprises a maximum lateral force that a front left tire and a front right tire together can generate;

adjust a desired lateral acceleration and a desired yaw rate by applying the correction factor to account for a reduced level of friction experienced by the vehicle when traveling on a non-ideal friction surface when the vehicle is performing a limit handling maneuver;

calculate optimal control actions based on the adjusted desired lateral acceleration and adjusted desired yaw rate; and apply the optimal control actions with vehicle actuators during vehicle operations.

2. The motion control system of claim 1, wherein the controller is configured to determine whether the vehicle is experiencing an understeer, oversteer, or normal steer condition based on calculating an understeer angle for the vehicle.

3. The motion control system of claim 2, wherein the understeer angle is determined based on the difference between a front lateral slip angle $\alpha_f$ and a rear lateral slip angle $\alpha_r$ for the vehicle.

4. The motion control system of claim 1, wherein the controller is configured to determine whether the vehicle is experiencing an understeer, oversteer, or normal steer condition based on front axle and rear axle saturation detection.

5. The motion control system of claim 1, wherein the second set of operations comprises calculating the correction factor ($\mu_e$) based on:

$$\mu_e = \frac{F_{y_r}}{F_{y_{max_r}}}$$

wherein $F_{y_r}$ comprises a lateral force applied to a rear axle, and $F_{y_{max_r}}$ comprises maximum lateral force that a rear left tire and a rear right tire together can generate.

6. The motion control system of claim 1, wherein the third set of operations comprises calculating the factor ($\mu_e$) based on:

$$\mu_e = \frac{F_{y_f} + F_{y_r}}{F_{y_{max_f}} + F_{y_{max_r}}}$$

wherein $F_{y_f}$ comprises a lateral force applied to the front axle, $F_{y_{max_f}}$ comprises a maximum lateral force that the front left tire and the front right tire together can generate, $F_{y_r}$ comprises a lateral force applied to a rear axle, and $F_{y_{max_r}}$ comprises a maximum lateral force that a rear left tire and a rear right tire together can generate.

7. The motion control system of claim 1, wherein to adjust the desired lateral acceleration and the desired yaw rate the controller is configured to:

receive driver steering and acceleration inputs while the vehicle is operated;

calculate an ideal lateral acceleration ($A_{y_{ideal}}$) and an ideal yaw rate ($r_{ideal}$) based on the steering and acceleration inputs, a vehicle model, and a tire model;

calculate a maximum lateral acceleration ($A_{y_{max}}$) and a maximum yaw rate ($r_{max}$) based on the tire model;

generate an adjusted maximum lateral acceleration $$(A_{y_{max_{adj}}})$$

by applying the correction factor ($\mu_e$) to the maximum lateral acceleration ($A_{y_{max}}$);

generate an adjusted maximum yaw rate ($r_{max_{adj}}$) by applying the correction factor ($\mu_e$) to the maximum yaw rate ($r_{max}$);

calculate the desired lateral acceleration ($A_{y_{des}}$) based on the ideal lateral acceleration ($A_{y_{ideal}}$) and the adjusted maximum lateral acceleration $$(A_{y_{max_{adj}}});$$

and calculate the desired yaw rate ($r_{des}$) based on the ideal yaw rate ($r_{ideal}$) and the adjusted maximum yaw rate ($r_{max_{adj}}$).

8. The motion control system of claim 7, wherein to calculate the desired lateral acceleration ($A_{y_{des}}$) the controller is configured to select the minimum of the ideal lateral acceleration ($A_{y_{ideal}}$) and the adjusted maximum lateral acceleration $$(A_{y_{max_{adj}}})$$

as the desired lateral acceleration ($A_{y_{des}}$).

9. The motion control system of claim 8, wherein to calculate the desired yaw rate ($r_{des}$) the controller is configured to select the minimum of the ideal yaw rate ($r_{ideal}$) and the adjusted maximum yaw rate ($r_{max_{adj}}$) as the desired yaw rate ($r_{des}$).

10. The motion control system of claim 7, wherein the adjusted maximum lateral acceleration $$(A_{y_{max_{adj}}})$$

equals the maximum lateral acceleration ($A_{y_{max}}$) multiplied by the correction factor ($\mu_e$).

11. The motion control system of claim 10, wherein the adjusted maximum yaw rate ($r_{max_{adj}}$) equals the maximum yaw rate ($r_{max}$) multiplied by the correction factor ($\mu_e$).

12. A method in a vehicle for exercising motion control, the method comprising:

calculating a correction factor using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state;

wherein the first set of operations comprises calculating the correction factor ($\mu_e$) based on:

$$\mu_e = \frac{F_{y_f}}{F_{y_{max_f}}}$$

wherein $F_{y_f}$ comprises a lateral force applied to a front axle, and $$F_{y_{max_f}}$$

comprises a maximum lateral force that a front left tire and a front right tire together can generate;

adjusting a desired lateral acceleration and a desired yaw rate by applying the correction factor to account for a reduced level of friction experienced by the vehicle when traveling on a non-ideal friction surface when the vehicle is performing a limit handling maneuver;

calculating optimal control actions based on the adjusted desired lateral acceleration and adjusted desired yaw rate; and applying the optimal control actions with vehicle actuators during vehicle operations.

13. The method of claim 12, wherein the second set of operations comprises calculating the correction factor ($\mu_e$) based on:

$$\mu_e = \frac{F_{y_r}}{F_{y_{max_r}}}$$

wherein $F_{y_r}$ comprises a lateral force applied to a rear axle, and $$F_{y_{max_r}}$$

comprises a maximum lateral force that a rear left tire and a rear right tire together can generate.

14. The method of claim 12, wherein the third set of operations comprises calculating the factor ($\mu_e$) based on:

$$\mu_e = \frac{F_{y_f} + F_{y_r}}{F_{y_{max_f}} + F_{y_{max_r}}}$$

wherein $F_{y_f}$ comprises a lateral force applied to the front axle, $F_{y_{max_f}}$ comprises a maximum lateral force that the front left tire and the front right tire together can generate, $F_{y_r}$ comprises a lateral force applied to a rear axle, and $$F_{y_{max_r}}$$

comprises a maximum lateral force that a rear left tire and a rear right tire together can generate.

15. The method of claim 12, wherein adjusting the desired lateral acceleration and the desired yaw rate comprises:

receiving driver steering and acceleration inputs while the vehicle is operated;

calculating an ideal lateral acceleration ($A_{y_{ideal}}$) and an ideal yaw rate ($r_{ideal}$) based on the steering and acceleration inputs, a vehicle model, and a tire model;

calculating a maximum lateral acceleration ($A_{y_{max}}$) and a maximum yaw rate ($r_{max}$) based on the tire model;

generating an adjusted maximum lateral acceleration $$(A_{y_{max_{adj}}})$$

by applying the correction factor ($\mu_e$) to the maximum lateral acceleration ($A_{y_{max}}$);

generating an adjusted maximum yaw rate ($r_{max_{adj}}$) by applying the correction factor ($\mu_e$) to the maximum yaw rate ($A_{y_{max}}$);

calculating the desired lateral acceleration ($A_{y_{des}}$) based on the ideal lateral acceleration ($A_{y_{ideal}}$) and the adjusted maximum lateral acceleration $$(A_{y_{max_{adj}}});$$

and;

calculating the desired yaw rate ($r_{des}$) based on the ideal yaw rate ($r_{ideal}$) and the adjusted maximum yaw rate ($r_{max_{adj}}$).

16. The method of claim 15, calculating the desired lateral acceleration ($A_{y_{des}}$) comprises selecting the minimum of the ideal lateral acceleration ($A_{y_{ideal}}$) and the adjusted maximum lateral acceleration $$(A_{y_{max_{adj}}})$$

as the desire lateral acceleration ($A_{y_{des}}$).

17. The method of claim 16, wherein calculating the desired yaw rate ($r_{des}$) comprises selecting the minimum of the ideal yaw rate ($r_{ideal}$) and the adjusted maximum yaw rate ($r_{max_{adj}}$) as the desired yaw rate ($r_{des}$).

18. A non-transitory computer readable media encoded with programming instructions configurable to cause a controller in a vehicle to perform a method, the method comprising:

calculating a correction factor using one of three different sets of operations when the vehicle is performing a limit handling maneuver, wherein the correction factor is calculated using a first set of operations when the vehicle is operating in an understeer state, calculated using a second set of operations when the vehicle is operating in an oversteer state, and calculated using a third set of operations when the vehicle is operating in a neutral steer state;

wherein the first set of operations comprises calculating the correction factor ($\mu_e$) based on:

$$\mu_e = \frac{F_{y_f}}{F_{y_{max_f}}}$$

wherein $F_{y_f}$ comprises a lateral force applied to a front axle, and $F_{y_{max_f}}$ comprises a maximum lateral force that a front left tire and a front right tire together can generate;

adjusting a desired lateral acceleration and a desired yaw rate by applying the correction factor to account for a reduced level of friction experienced by the vehicle when traveling on a non-ideal friction surface when the vehicle is performing a limit handling maneuver;

calculating optimal control actions based on the adjusted desired lateral acceleration and adjusted desired yaw rate; and applying the optimal control actions with vehicle actuators during vehicle operations.

19. The non-transitory computer readable media of claim 18, wherein the second set of operations comprises calculating the correction factor ($\mu_e$) based on:

$$\mu_e = \frac{F_{y_r}}{F_{y_{max_r}}}$$

wherein $F_{y_r}$ comprises a lateral force applied to a rear axle, and $F_{y_{max_r}}$ comprises a maximum lateral force that a rear left tire and a rear right tire together can generate.

20. The non-transitory computer readable media of claim 18, wherein the third set of operations comprises calculating the factor ($\mu_e$) based on:

$$\mu_e = \frac{F_{y_f} + F_{y_r}}{F_{y_{max_f}} + F_{y_{max_r}}}$$

wherein $F_{y_f}$ comprises a lateral force applied to the front axle, $F_{y_{max_f}}$ comprises a maximum lateral force that the front left tire and the front right tire together can generate, $F_{y_r}$ comprises a lateral force applied to a rear axle, and $F_{y_{max_r}}$ comprises a maximum lateral force that a rear left tire and a rear right tire together can generate.

\* \* \* \* \*